June 16, 1959     A. R. SMITH     2,890,492

PROCESS OF MAKING A ROCK-FACED BUILDING PRODUCT

Filed May 29, 1956

*INVENTOR.*
ALBERT R. SMITH
BY
ATTORNEYS

2,890,492
PROCESS OF MAKING A ROCK-FACED BUILDING PRODUCT

Albert R. Smith, Lansing, Mich.

Application May 29, 1956, Serial No. 588,019

6 Claims. (Cl. 18—60)

This invention relates to a process of making rock-faced building products, and more particularly to a novel and inventive discovery in the process which produces a finished rock-faced product that has a very attractive and natural appearance.

The invention involves the process in which a creamy plastic flowable cementitious material is mixed and combined with rock material, of desired size, coloration and texture, in a mold or form. The mass is then agitated by vibration to orient the rock material into a close packed related formation upon the base plate of the mold. The base plate is arranged with a surface that will make firm and positive adhesion with the cemetitious material of the mix. Following agitation and orientation of the rock material, the mold may be filled with more of the cementitious material to form a block of the desired thickness, or the mold may be filled with a concrete mix having greater load bearing strength than the cementitious material, or the mix in the mold may be allowed to solidify without further addition.

Following a period of solidification of about eight hours or longer, depending upon the character of the cementitious material, the mold is inverted and the base plate is firmly tapped or struck from below, about the form of the mold until separation of the molded block from the mold is achieved. Or the mold, including the base plate may be lifted, so that upon striking the base plate about the mold side forms, separation of the base plate from the block will result. Separation at the base plate takes place along a plane which includes the top or upper surface faces of the rock material, regardless of their irregularities. Part of the cementitious material remains with the mold base plate by reason of its great adhesion thereto, leaving an irregular planar arrangement of cement about the rock material that is both attractive and natural. Because the rock material, which is preferably stone of any desired size, coloration and texture, is closely surrounded and held by the cement, and because the agitation by vibration of the mold places the stones in a close packed position natural to their varying configurations, the resultant product has a most natural and beautiful appearance. The stones are not all in identical positions with respect to each other, and the surface of each stone is not flat.

It is important to recognize that the separation of the cementitious material from the surface of each stone is complete, leaving the exposed stone surface free of any cement. The cement further separates from itself along an irregular line that closely conforms to what appears to be the surface side of the stone nearest to the base plate. When the base plate and form, comprising the mold, separates from the block, it is found that the base plate contains on its surface a complementary matrix of cementitious material corresponding to the surface of the block. This cement matrix is firmly bonded or anchored to the base plate and separation has taken place along a plane that includes the upper surface of the stones or rock material closest to the base plate. It is believed that this plane of separation is achieved because there is no chemical adhesion of the cementitious material to the rock material and because there is a strong and positive adhesion of the cementitious material to the base plate, i.e. the amount of land contact with the base plate is considerably greater than the area of cement at the plane of the rock material surfaces closest to the base plate.

Following separation of the block from the mold, the usual curing, setting and drying steps or operations associated with cement type building products are employed.

An optional construction of the block includes the placing of strands of hemp or rope or similar material in the cementitious plastic mix above the rock material to serve as reinforcement for the block.

Heretofore, the casting of this type of block involved some serious limitations, which resulted from an entirely different approach to the problem of constructing a cast rock- or stone-faced block. In the past, the entire mold has been designed to be quickly, entirely, and freely releasable from the cast block. The reason for this was that the producer desired to obtain a product from the entire mass of cement poured into the mold. Nothing was to remain in the mold or attached to any part thereof, after proper setting of the block. In the instant case, the reverse is true. It is an essential feature of the invention that there be adherence of a portion of the cementitious material to the base plate of the mold in order that such portion lying above the upper surfaces of the rock material, when in releasing position, shall break away from the block along fissure lines coinciding with the upper surfaces of the rock material. Thus, when full separation occurs, the finished building block presents a rock-faced surface free of any cement coating on the exposed side of the rocks.

The finished blocks, which are designed for use primarily as surfacing material on the front and sides of buildings, or other construction, have a very natural and ornamental appearance, as a result of the process and apparatus used in this invention. The blocks may be constructed in any dimensions desired or required and are not limited to the general configuration shown in the drawing.

These and additional objects of the invention and features of the process employed therein will become more apparent from the description of a preferred embodiment of the invention given below, in which the terms are used for purposes of description and not of limitation.

Referring now to the drawing annexed hereto and forming an integral part hereof, Fig. 1 is a plan view of the rock-faced block produced by the process and apparatus of this invention.

Figure 1:
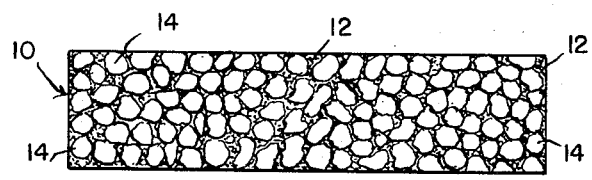
Figure 2:
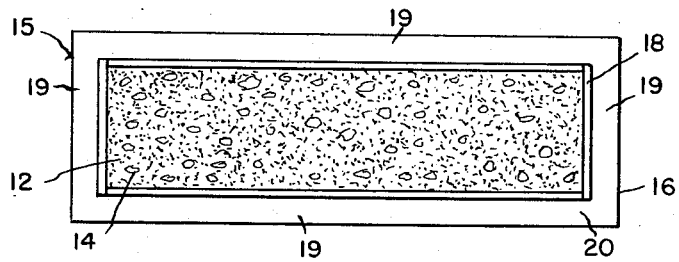
Fig. 2 is a plan view of the mixture of the initial cementitious material and rock material in the mold.
Figure 3:
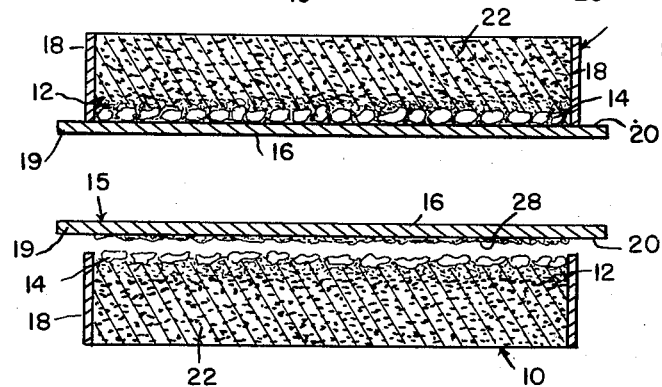
Fig. 3 is a vertical sectional view of the mold and contents including an additional layer of coarse cement to form a heavier building block.

As shown in Figs. 1 through 4, the molded stone or rock-faced building product 10 of this invention comprises a mass of cementitious material 12 and rock material 14.

It will be readily understood that various kinds of both cementitious and rock materials may be used in the process and apparatus of this invention. Such cements as white cement, Keene's cement, or Portland cement may be employed. A preferred cementitious material is a mixture of two parts of fine sand—marble dust or ground rock or stone will also serve—and one part of Portland cement or any other good cement, to which water is added in an amount to make a creamy, plastic, flowable mass. On the other hand, a concrete cement type mix may be used, depending upon the appearance and effect desired.

The rock material 14, which may be field stone, slate, granite, marble or other rocky formations, chosen for suitability of size, coloration and texture, may be admixed with the cement 12 until the rock material 14 is well coated, i.e. the stones are fully surrounded and covered with the cement. The mixing of cement 12 and rocks 14 may be made in any suitable kind of mixing apparatus available.

The mold 15 which comprises a base plate 16 and side forms 18, is arranged to receive the admixture of cement 12 and rocks 14 after mixing. The base plate 16 should be arranged in dimensions that provide a flange on each side beyond the side forms 18, as shown. These flange portions are designated by the numeral 19. The side forms 18 are generally placed freely upon the base plate without positive attachment thereto. Thus when the mold is raised, it may be held at the side forms 18 and the base plate 16 struck in a downwardly direction. Or the mold 15 may be inverted, and the base plate struck in an upwardly direction, as described below. After solidification of the mold contents, and following separation of the base plate 16 from the block product 10, the side forms 18 generally remain during the curing, hardening and drying operations.

As an alternative step, the rock material 14 may be placed directly upon the base plate 16 by hand or by other suitable means, and the cementitious material 12 poured upon the rocks 14 and permitted to settle to the base plate 16. Or conversely, the cement 12 may be poured into the mold and the rock material 14 added thereto by dropping into the mold.

Whether the one or the other step is used, when the two materials 12 and 14 are in the mold 15, the mold and its contained mix is subjected to agitation by vibration, so that the stones 14 will orient themselves upon the base plate 16 into a close packed related arrangement, and the cement 12 will flow positively to the base plate 16, there to become firmly anchored to the base plate.

Figure 5:
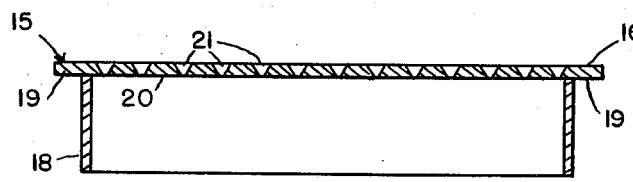
Fig. 5 is a vertical sectional view of the mold showing a modified base plate.
Figure 6:
Fig. 6 is a vertical sectional view of a modified molded building product containing strands of reinforcing material.

Whereas in the prior art and in the industry, a mold base plate having non-adherent easily releasable characteristics has been a necessary and required feature of cement block molds, the base plate 16 of this invention must have such surface features as will cause the cementitious material 12 to adhere firmly and positively to it. To accomplish this result, the base plate surface 20 which comes into intimate contact with the building product mix is prepared by causing it to rust rather severely, or by roughening the surface to provide a mechanical bonding means with the cement 12, or by perforating the plate with holes 21, as shown in Fig. 5, or by causing a thin film of cement to become firmly anchored to the contact surface 20 prior to pouring the mixture of cement 12 and rocks 14 into the mold 15.

Enough of the cementitious material 12 to surround the rock material 14, so as to firmly hold it in the block 10, should be used. Often this amount will correspond roughly to the depth of the rock layer. It may be somewhat lesser or greater, however, without any material effect on the product.

Since the product 10 is used generally as a surfacing material for building construction, it may have few if any load bearing requirements, and therefore the thickness of the rock-faced building block 10 may be substantially the thickness of the rock layer or slightly greater. To strengthen the block for load bearing, as when it is to be used as part of a wall, a second layer of a strong coarser concrete type cement mix 22 may be added to the first layer of cementitious and rock materials 12 and 14 and the dimensions increased to the desired proportions. Such a block is shown in the sectional views, Figs. 3 and 4. The backing layer 22 is an alternative addition, if desired or required; it is not absolutely essential in the practice of the invention. The proper time to add the backing layer cement material 22 is directly after the first mixture has been poured into the mold 15 and agitated by vibration.

Another means of reinforcing the block 10 is to arrange strands of hemp 26 in the direction or directions most needful of reinforcement, within the first layer of cement and rocks, 12 and 14. Such equivalent materials for the hemp, that will perform substantially the same function, include wire, in strands or mesh, rope, or plastic materials, as the polyvinyls, styrenes and the like.

Following the molding step in this process, the molded contents are allowed to set for a period of time. This period of time should be such as to allow the cement 12 to solidify and to adhere firmly to the base plate 16. It has been found that when a cement mixture 12, containing one to two percent of calcium chloride in the Portland cement, has been used, about ten hours setting time, or slightly longer is sufficient to achieve the desired results.

Figure 4:
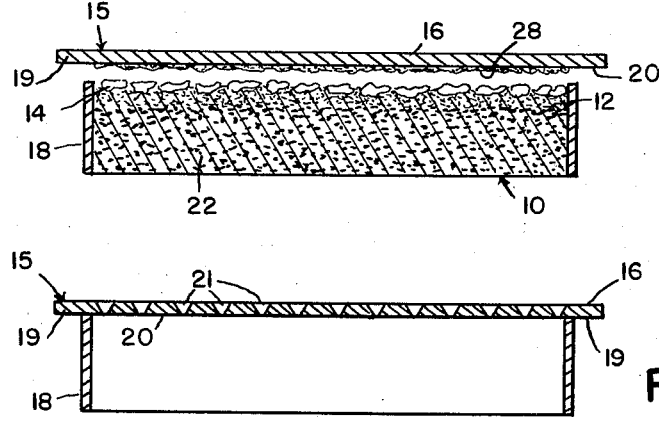
Fig. 4 is a vertical sectional view of the mold in inverted position showing the molded building product being released from the mold.

The mold 15 is then inverted, as shown in Fig. 4. Firm, sharp tapping forces are applied to the under side of the base plate 16 around the side forms 18, at the flange portions 19. As these blows fracture the cementitious material 12 at the upper planar surfaces of the rock material 14, the cement 12 breaks about the stones or rocks 14, leaving their surfaces completely free of any cement, and the surrounding cement fractures to release the rock-faced building block 10 from the mold. As shown in Fig. 4, the cement material 12 in direct adhering contact with the base plate surface 20 represents the complementary upper surface matrix 28 of the rock-faced building block 10.

The block 10 comes away clean and free of the mold 15. The exposed surfaces of the rock material 14 are clean and free of any cement 12. The block 10 is ready for the curing, hardening and drying operations normally accorded cement blocks. No wire brushing or scraping is necessary. The top exposed surface of block 10 is completely ready for use. If one desires, a water rinse to wash off dust particles may be applied, but no cleaning, as such, is necessary. The building block 10 is ready for application to a building structure in accordance with the usual practices for such construction.

Since an essential feature of the inventive process lies in obtaining positive adhesion of the cementitious material 12 to the mold base plate 16, it is emphasized that the surface 20 of the base plate should be so treated and prepared as to provide some type of bond with the cementitious material, when hardened. Such preparation and treatment may include corroding the surface with rust, mechanically roughening the surface, boring holes in the base plate so that the cement will run through to provide a number of mechanical grips. It has been found that after base plate 16 has been used a number of times, it acquires a coating of cement that provides an excellent anchor for further molding. Generally, the heavier and irregular cement matrix 28 is cut down to a thinner even film on the base plate. Other types of treatment may occur to those skilled in the art, whereby this function can be obtained. The side forms 18 of the mold should be easily releasable from the cast block, and are generally constructed according to current practices. The side forms 18, or "frame," rests on the surface of the base plate 16, irrespective of its coating thickness of cement.

Having described my invention in its simplest and preferred form it is to be clearly understood that the features thereof may be varied in greater or lesser degree without departing from the essence of the invention.

I claim:
1. In the process of making an ornamental rock-faced cast molded building block containing cementitious material, the steps which comprise preparing the base plate of the casting mold so that it will form a positive bond with the cementitious material of the building block, forming a mass of cementitious material having a creamy plastic flowable consistency, pouring said cementitious material into said mold, adding rock material to said mass of cementitious material, agitating said mold and contents by vibration to orient said rock material upon the base plate of said mold into a related arrangement, allowing the contents of said mold to harden and to adhere to said base plate, inverting said mold, striking said mold base plate from below in an upward direction causing that portion of said hardened cementitious material in contiguous contact with said base plate to adhere to said base plate and separate from said rock material along the upper planar surfaces of said rock material leaving the upper exposed surfaces of said rock material free of cementitious material, and releasing said block from said mold.

2. In the process of making an ornamental rock-faced cast molded building block containing cementitious material, the steps which comprise preparing the base plate of the casting mold so that said cementitious material will have positive adhesion to said base plate when hardened, forming a mass of said cementitious material to a creamy plastic flowable consistency, admixing rock material of desired size to said mass of cementitious material, pouring said mixture into said mold, agitating said contents by vibrating said mold so as to orient said rock material upon the face of said base plate into a related arrangement, allowing the contents of said mold to harden and to adhere to said base plate, inverting said mold, striking said base plate from below in an upwardly direction causing that portion of said hardened cementitious material in contiguous contact with said base plate to adhere to said base plate and to separate from said rock material along the upper planar surfaces of said rock material and leave the upper exposed surfaces of said rock material free of cementitious material, and releasing said block from said mold.

3. In the process of making an ornamental rock-faced cast molded building block containing cementitious material, the steps which include preparing the base plate of the casting mold so that said cementitious material will have positive adhesion to said base plate when hardened, filling said mold to the desired depth with a mass of said cementitious material having a creamy plastic flowable consistency and with rock material of desired size, agitating said contents by vibrating said mold so as to orient said rock material upon said base plate into a related arrangement, allowing the contents of said mold to harden and to adhere to said base plate, inverting said mold, striking said base plate from below in an upwardly direction causing that portion of said hardened cementitious material in contiguous contact with said base plate to adhere to said base plate and to separate from said rock material along the upper planar surfaces of said rock material leaving the upper exposed surfaces of said rock material free of cementitious material, and releasing said block from said base plate and mold.

4. The process defined in claim 3, in which said mold is filled above said mass of cementitious material and rock material with a layer of coarser cement material following said agitation.

5. In the process of making an ornamental rock-faced cast molded building block containing cementitious material, the steps which include preparing the base plate of a casting mold so that said cementitious material will have positive adhesion to said base plate when hardened, placing rock material of desired size on said base plate within said mold, agitating said rock material in said mold to orient the same into a close packed related arrangement, adding a mass of said cementitious material having a creamy plastic flowable consistency to the desired depth in said mold, agitating the contents of said mold by vibration to settle said cementitious material to said base plate, allowing the contents of said mold to harden and to adhere to said base plate, inverting said mold, striking said base plate from below in an upwardly direction causing that portion of said hardened cementitious material in contiguous contact with said base plate to adhere to said base plate and to separate from said rock material along the upper planar surfaces of said rock material leaving the upper exposed surfaces of said rock material free of cementitious material, and releasing said block from said mold.

6. In the process of making an ornamental rock-faced cast molded building block containing cementitious material, the steps which include preparing the base plate of the casting mold so that said cementitious material will have positive adhesion to said base plate when hardened, filling said mold to the desired depth with a mass of said cementitious material and with rock material, agitating said contents by vibrating said mold so as to orient said rock material upon said base plate into a related arrangement, allowing the contents of said mold to harden in a position of rest and the cementitious material to adhere to said base plate, raising said mold from said position of rest, striking said base plate in a downwardly direction causing that portion of said hardened cementitious material in contiguous contact with said base plate to adhere to said base plate and to separate from said rock material along the lower planar surfaces of said rock material and leave the lower exposed surfaces of said rock material free of cementitious material, and releasing said block from said base plate.

References Cited in the file of this patent

UNITED STATES PATENTS

| | | |
|---|---|---|
| 219,579 | Hartley | Sept. 16, 1879 |
| 287,552 | Lapersonnerie | Oct. 30, 1883 |
| 1,166,312 | Barten | Dec. 28, 1915 |
| 1,194,554 | Seiler | Aug. 15, 1916 |
| 1,211,632 | Shaw | Jan. 9, 1917 |
| 1,472,516 | Dula | Oct. 30, 1923 |
| 1,666,232 | Boynton | Apr. 17, 1928 |
| 1,809,504 | Carvel | June 9, 1931 |
| 2,034,164 | Van Kameric | Mar. 17, 1936 |
| 2,037,545 | Sexton | Apr. 14, 1936 |
| 2,172,466 | Edwardes | Sept. 12, 1939 |
| 2,577,215 | Smith | Dec. 4, 1951 |
| 2,677,856 | Garnich | May 11, 1954 |
| 2,689,381 | Terriere | Sept. 21, 1954 |
| 2,700,810 | Garni | Feb. 1, 1955 |
| 2,770,864 | Weese | Nov. 20, 1956 |

FOREIGN PATENTS

| | | |
|---|---|---|
| 18,304 | Great Britain | Aug. 24, 1904 |
| 442,227 | Great Britain | Feb. 3, 1936 |